United States Patent
Conroy et al.

(10) Patent No.: US 6,870,928 B1
(45) Date of Patent: Mar. 22, 2005

(54) LINE INTERFACE, APPARATUS AND METHOD FOR COUPLING TRANSCEIVER AND TRANSMISSION LINE

(75) Inventors: Cormac S. Conroy, Sunnyvale, CA (US); Samuel W. Sheng, San Jose, CA (US); Ara Bicakci, San Jose, CA (US); John DeCelles, Campbell, CA (US); Sang-Soo Lee, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 432 days.

(21) Appl. No.: 09/866,525

(22) Filed: May 25, 2001

(51) Int. Cl.$^7$ .............................................. H04M 1/00
(52) U.S. Cl. .................. 379/399.01; 379/391; 379/392; 379/402
(58) Field of Search .......................... 379/399.01, 402, 379/403, 404, 405, 391, 392; 375/222, 257, 258

(56) References Cited

U.S. PATENT DOCUMENTS

| | | | | |
|---|---|---|---|---|
| 4,881,244 A | * | 11/1989 | Haug ........................ | 375/258 |
| 5,515,433 A | * | 5/1996 | Chen ......................... | 379/398 |
| 5,528,630 A | * | 6/1996 | Ashley et al. .............. | 375/258 |
| 5,838,722 A | * | 11/1998 | Consi ........................ | 375/219 |
| 6,163,579 A | * | 12/2000 | Harrington et al. ......... | 375/257 |
| 6,218,872 B1 | * | 4/2001 | Koren ........................ | 327/108 |
| 6,226,331 B1 | * | 5/2001 | Gambuzza ................. | 375/258 |
| 6,323,686 B1 | * | 11/2001 | Bisson et al. ............... | 326/82 |
| 6,327,309 B1 | * | 12/2001 | Dreyer et al. .............. | 375/258 |
| 6,369,650 B1 | * | 4/2002 | Hayat-Dawoodi ........... | 330/69 |
| 6,400,772 B1 | * | 6/2002 | Chaplik ...................... | 375/258 |
| 6,538,510 B1 | * | 3/2003 | Amrany et al. ............. | 330/252 |
| 6,608,860 B1 | * | 8/2003 | Naviasky et al. ........... | 375/216 |
| 6,633,642 B1 | * | 10/2003 | Oakley ....................... | 379/405 |

OTHER PUBLICATIONS

Analog Devices, "500 mA Differential Driver and Dual Low Noise (VF) Amplifiers", 1999, pp. 1–16.

"Silicon Laboratories Enters DSL Market With High–Performance Integrated ADSL Analog Front End", printed from http://biz.yahoo.com/prnews/010521/dam013.html on May 22, 2001.

Texas Instruments, "250–mA Dual Differential Line Driver", 1998, pp. 1–38.

* cited by examiner

*Primary Examiner*—Huyen Le
*Assistant Examiner*—Tuan Pham
(74) *Attorney, Agent, or Firm*—Thelen Reid & Priest LLP

(57) ABSTRACT

A line interface couples signals between a data transceiver and a transmission line having a load impedance Z. The line interface includes a transformer, a driver circuit for supplying a transmit signal from the data transceiver to the transformer, and a receiver circuit for receiving a receive signal from the transformer. The transformer includes a first port coupled to the transmission line, a second port coupled to the driver circuit, a third port coupled to the receiver circuit, a first winding part having a turns ratio of 1: n, where n>1, for coupling the transmit signal from the second port to the first port, and a second winding part having a turns ratio of 1: m, where m<n, for coupling the receive signal from the first port to the third port.

28 Claims, 9 Drawing Sheets

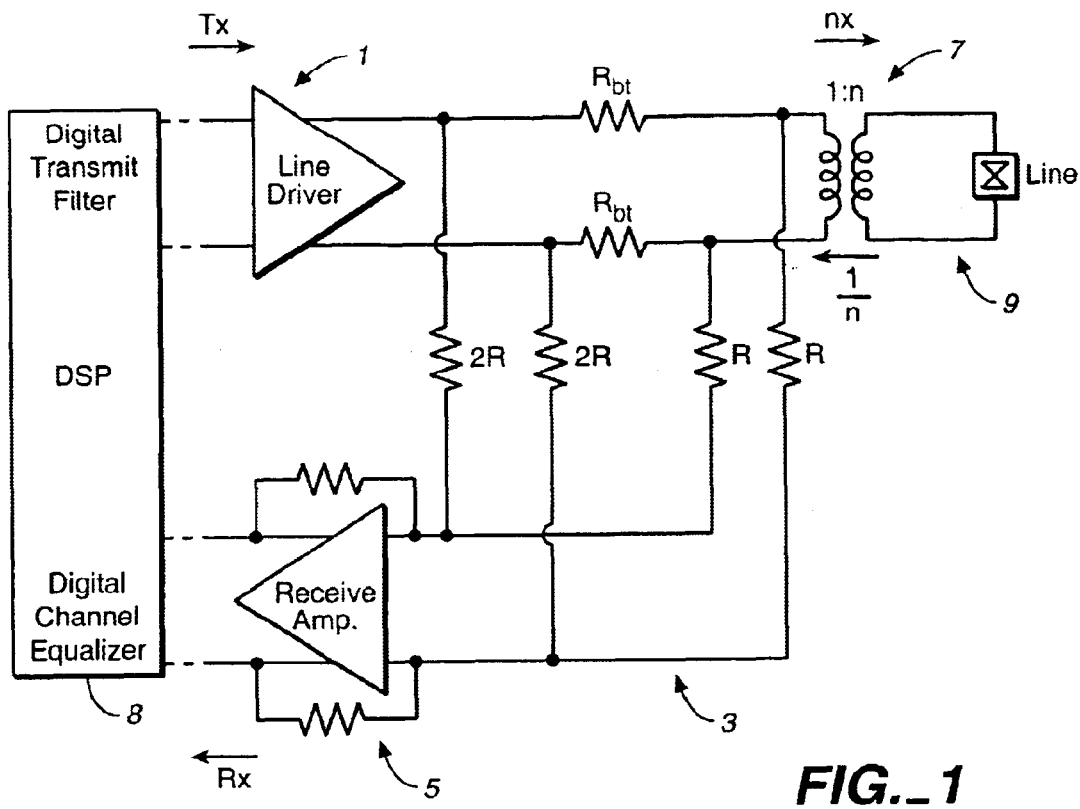
FIG._1
(PRIOR ART)
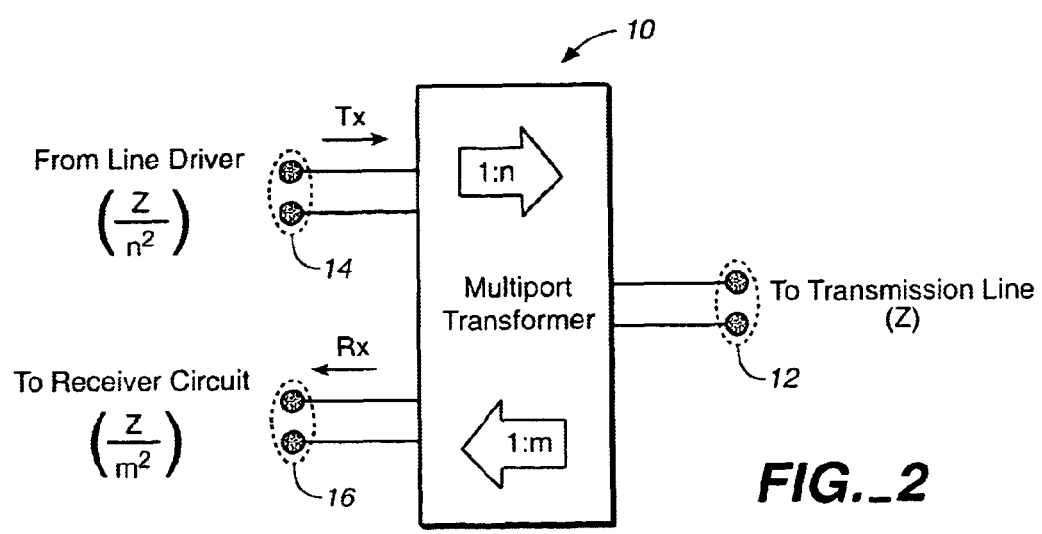
FIG._2

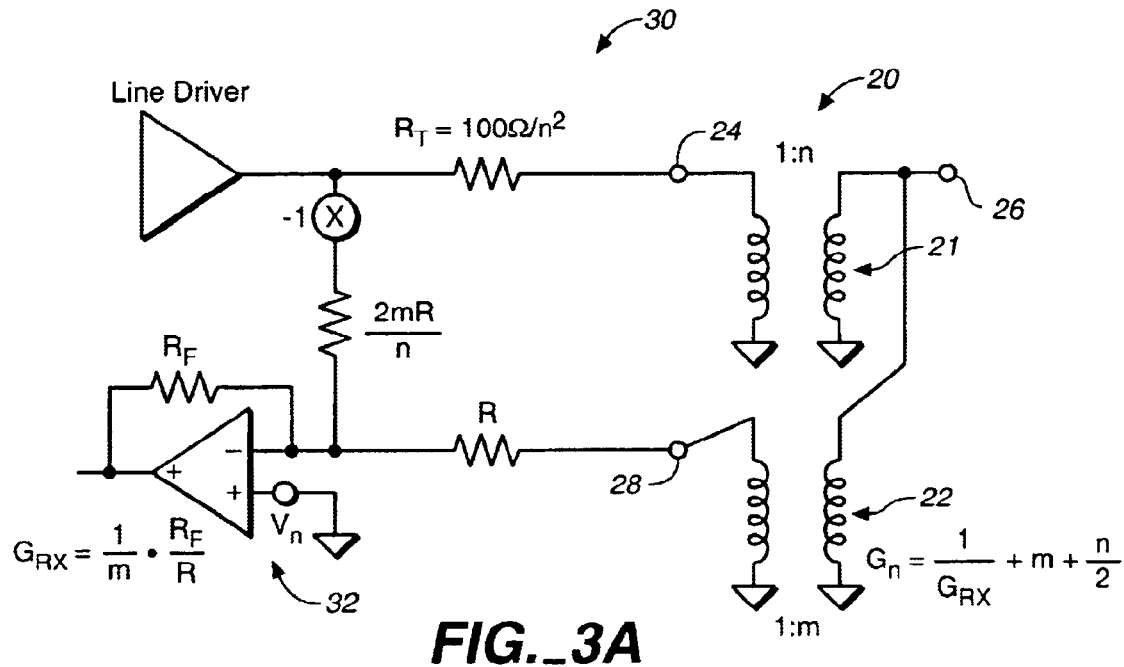
FIG._3A
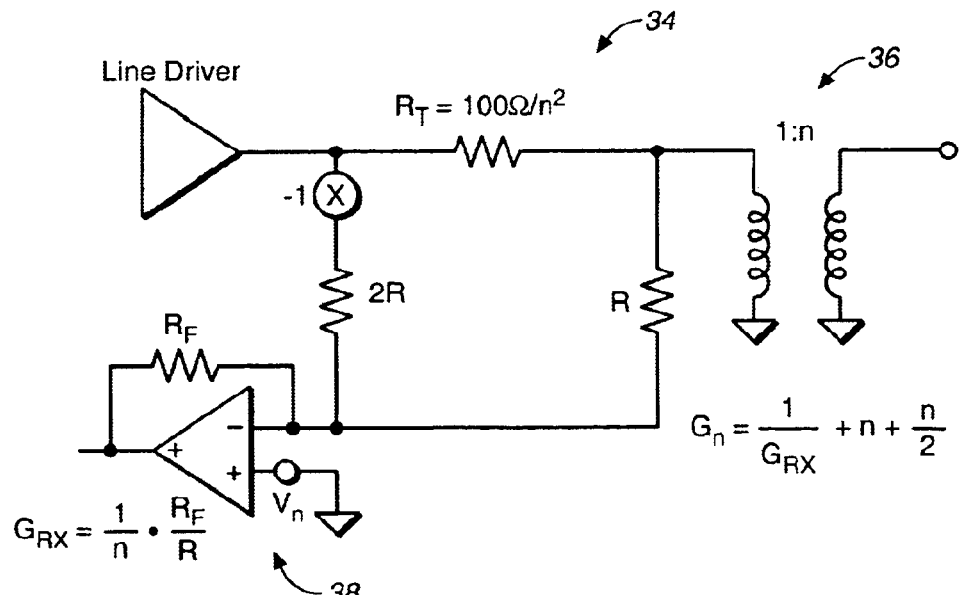
FIG._3B
*(PRIOR ART)*

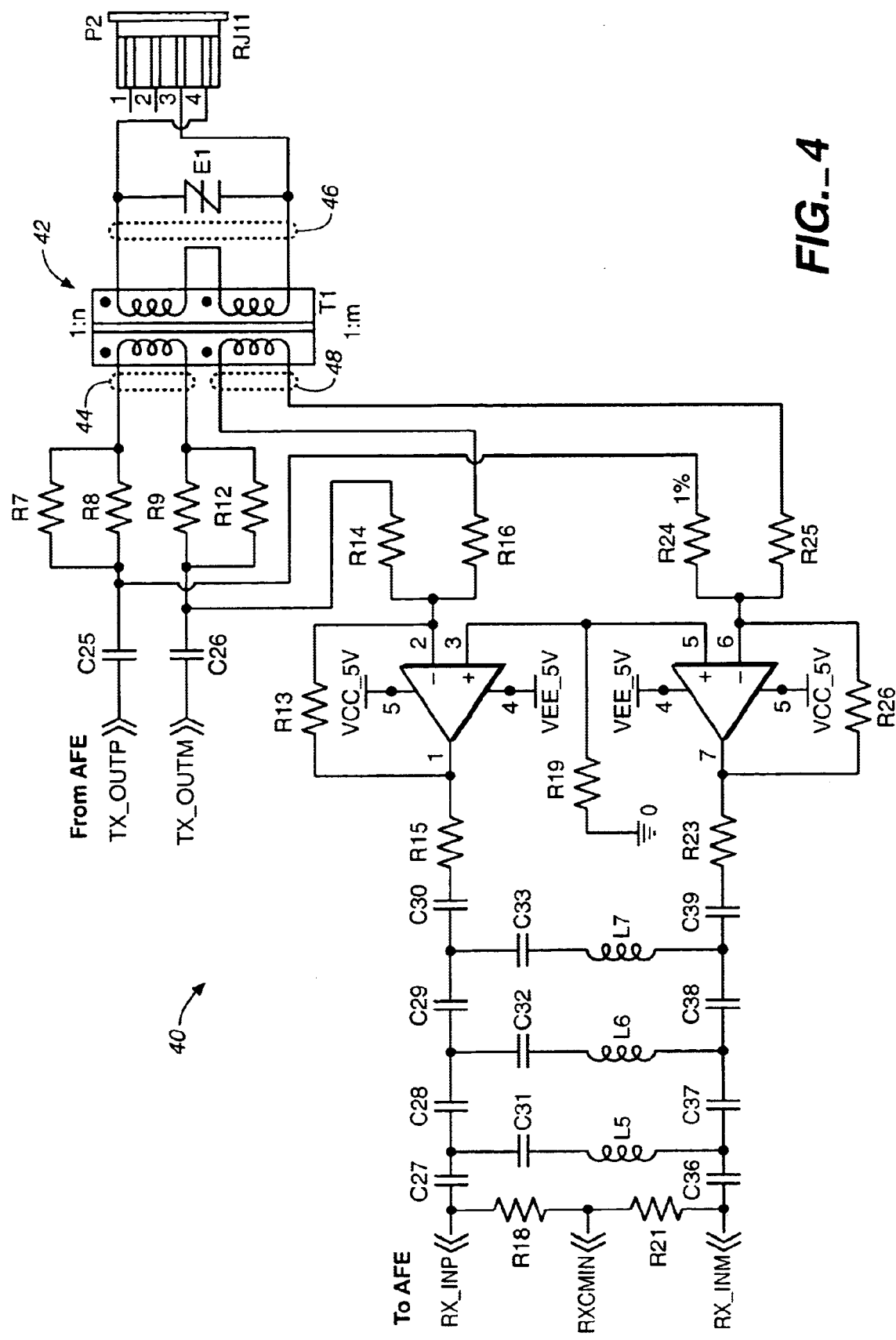
FIG._4

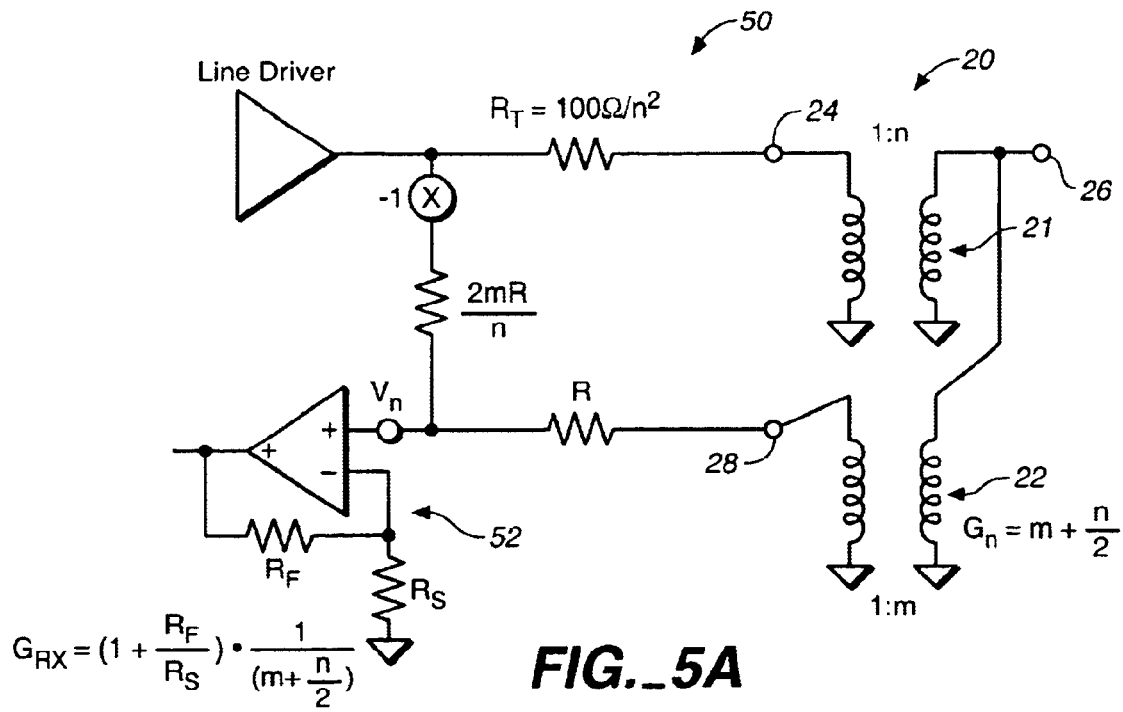
FIG._5A
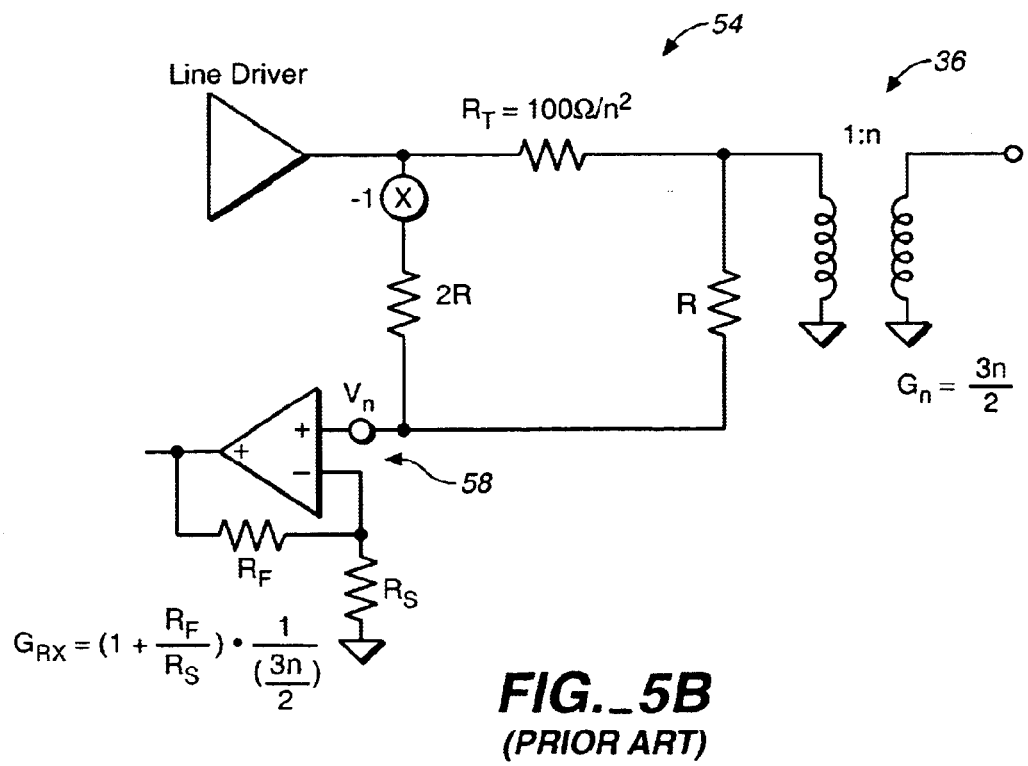
FIG._5B
*(PRIOR ART)*

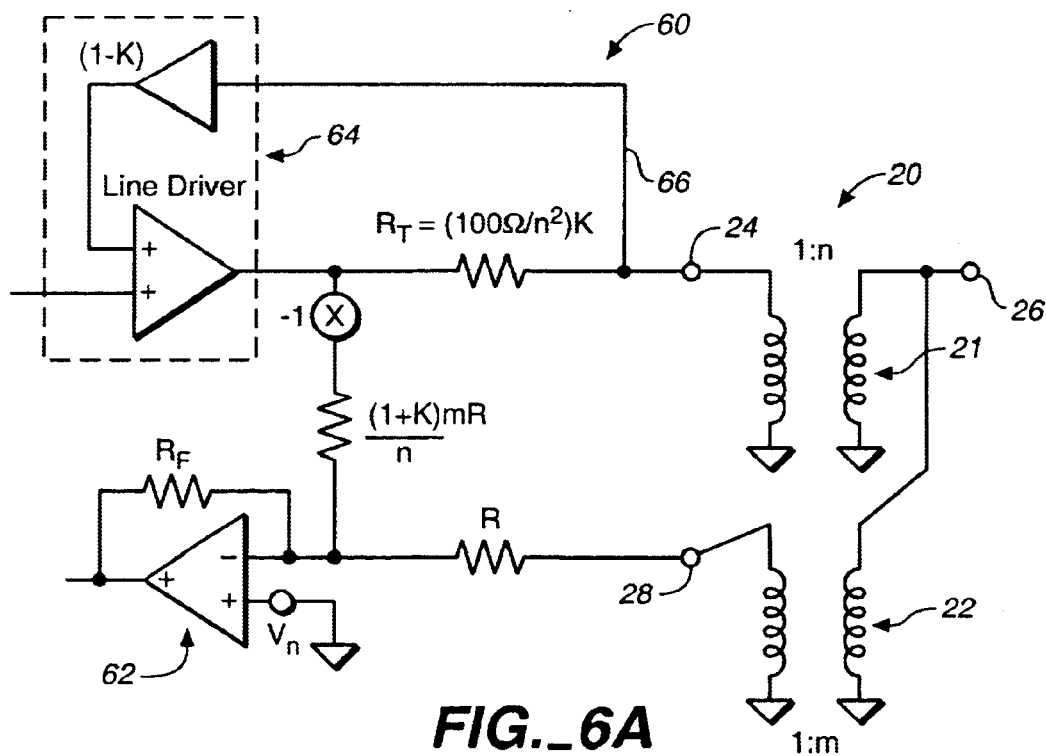
FIG._6A
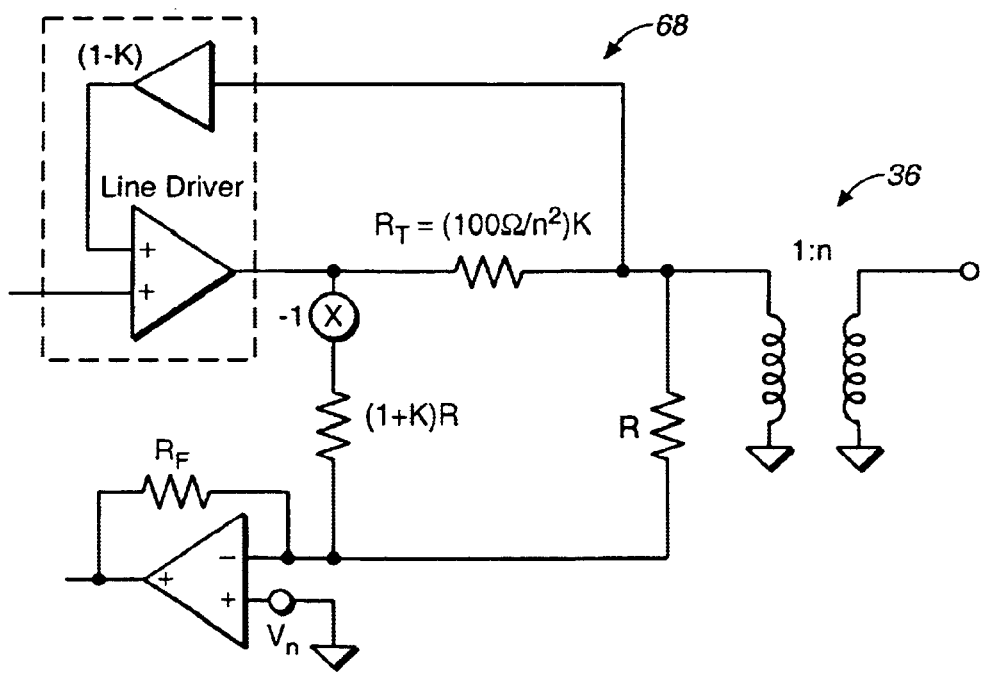
FIG._6B
*(PRIOR ART)*

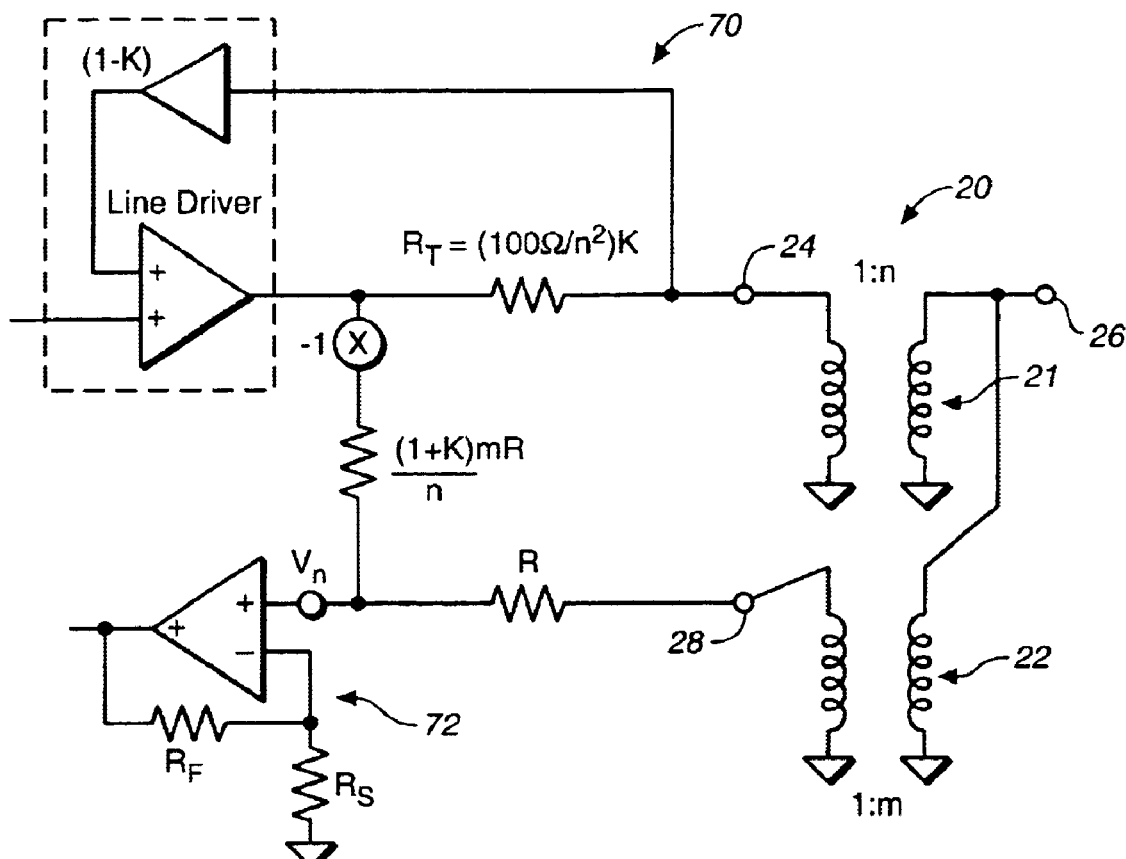
FIG._7

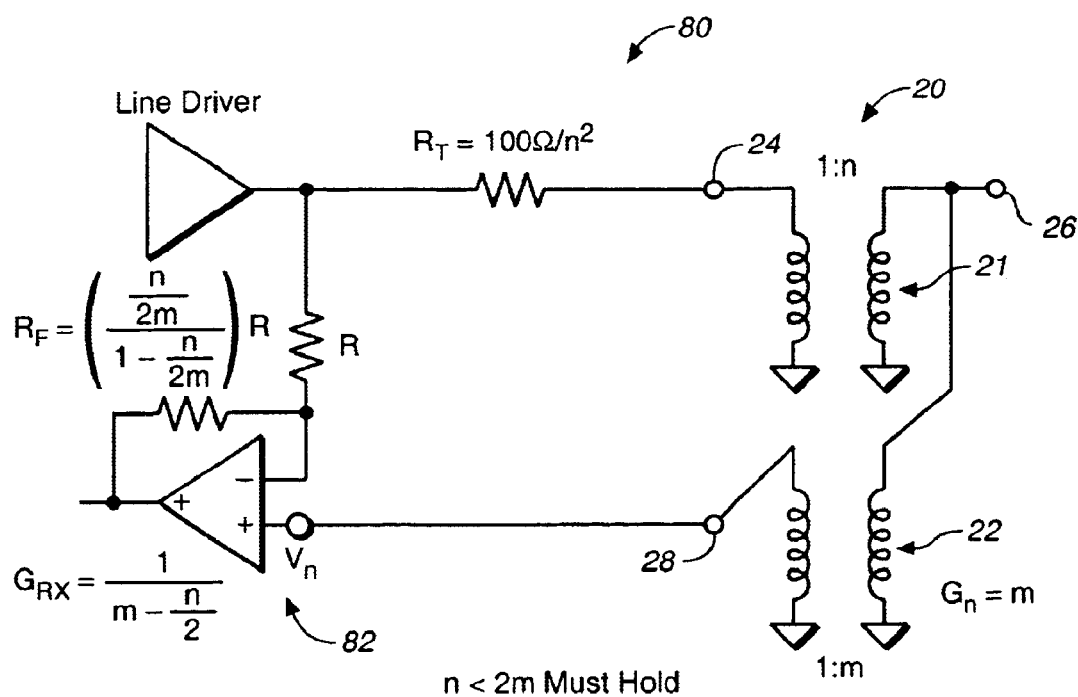
FIG._8A
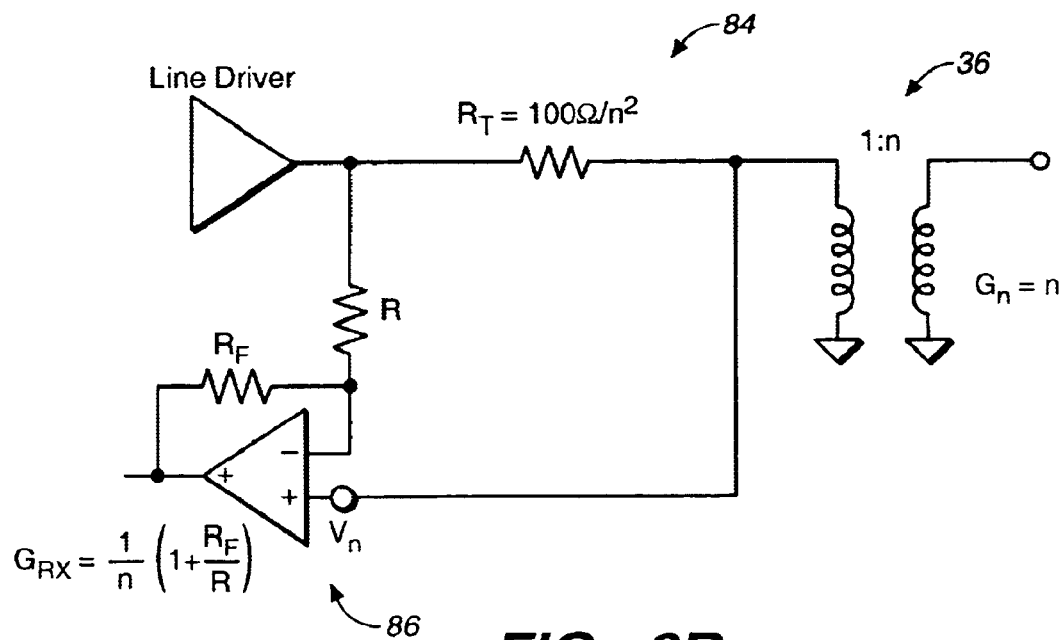
FIG._8B
*(PRIOR ART)*

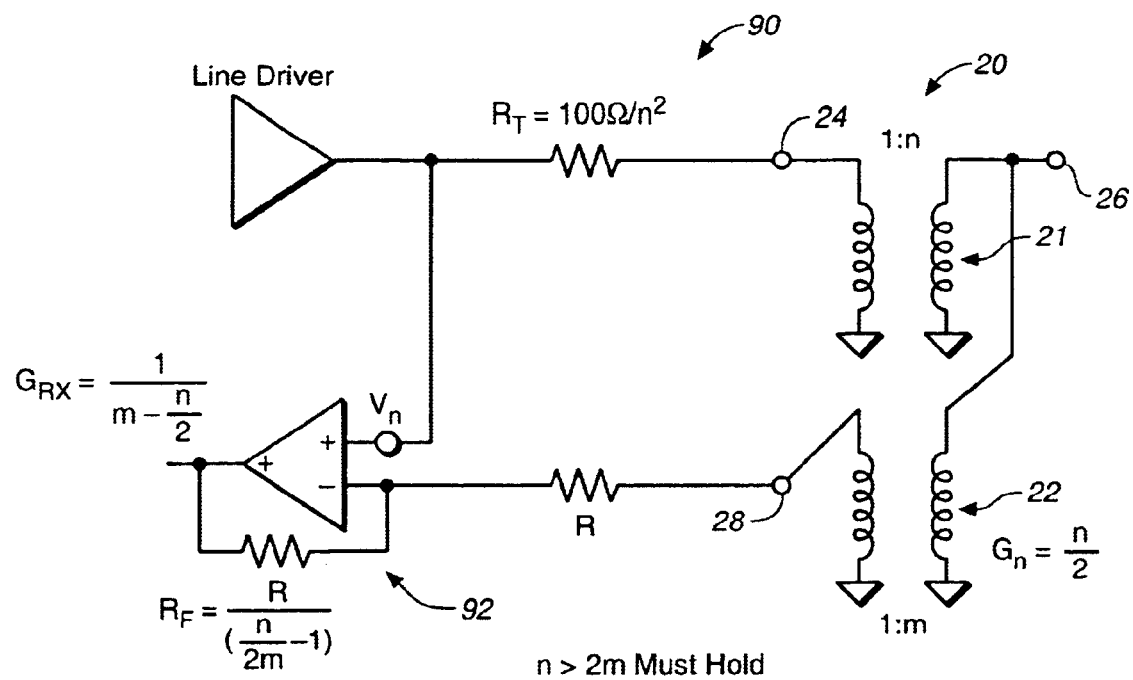
FIG._9A
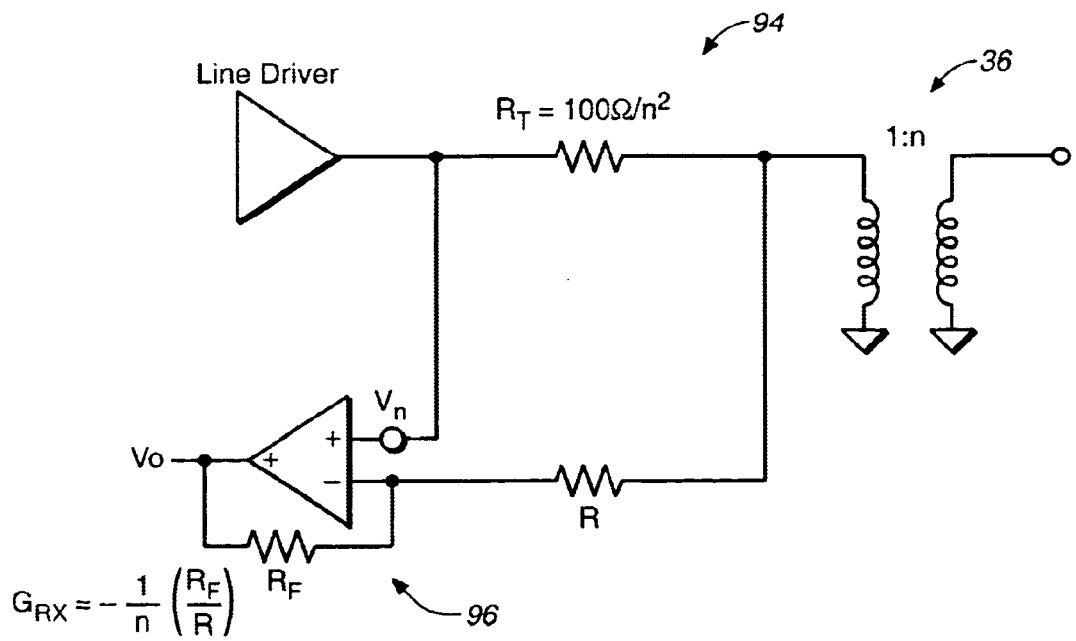
FIG._9B
*(PRIOR ART)*

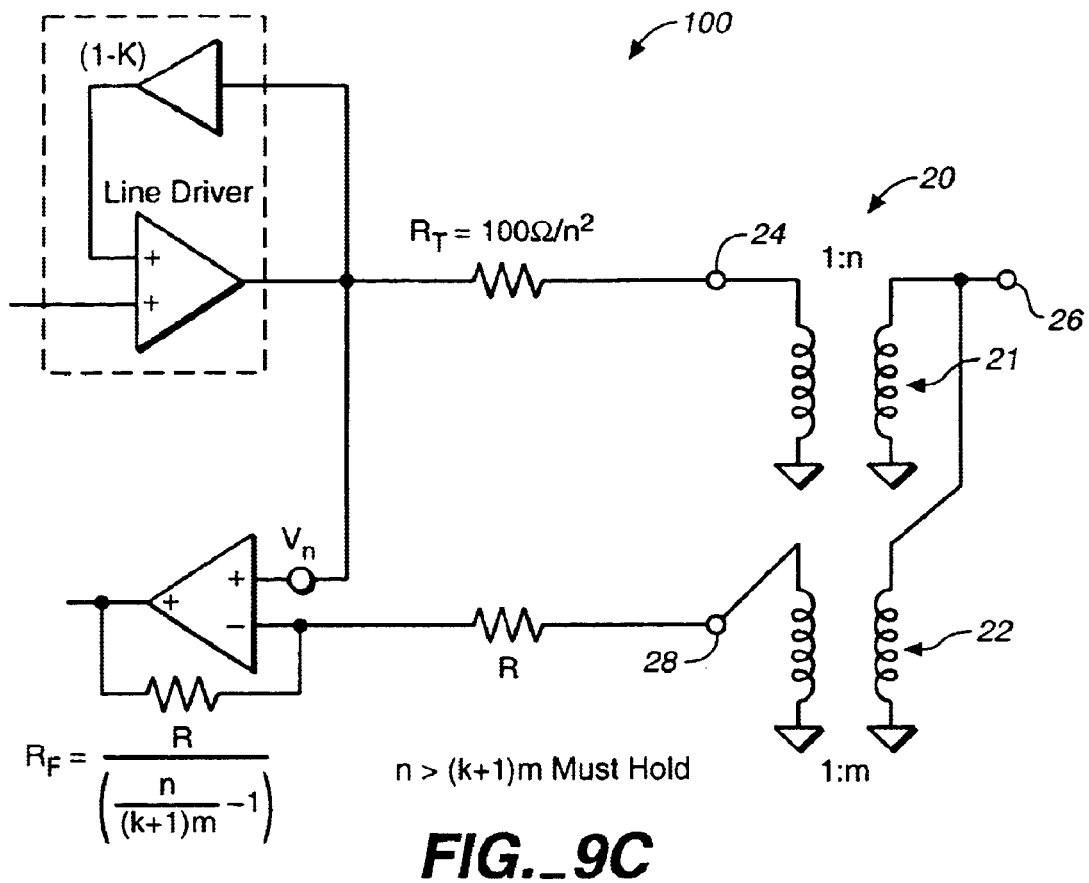
FIG._9C
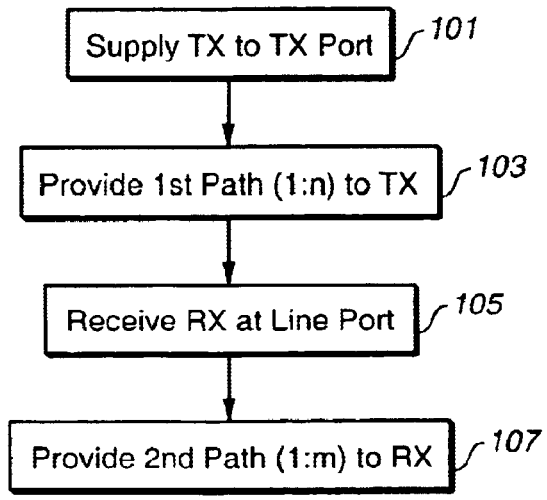
FIG._10

LINE INTERFACE, APPARATUS AND METHOD FOR COUPLING TRANSCEIVER AND TRANSMISSION LINE

FIELD OF THE INVENTION

The present invention relates to digital subscriber line (DSL) technologies. More particularly, the present invention relates to a low-voltage analog line interface for an asymmetrical digital subscriber line (ADSL) transceiver system.

BACKGROUND OF THE INVENTION

In an ADSL transceiver, the circuitry connecting between an integrated circuit of an analog front end (AFE) and the transmission line is referred to as an analog line interface. An AFE is a circuit block that provides the interface between the line transceiver and a digital signal processing (DSP) processor. FIG. 1 illustrates a typical hybrid structure of a conventional analog interface of an ADSL system. As shown in FIG. 1, an analog line interface typically includes a line driver 1, a hybrid circuit 3, a receive amplifier 5, and a transformer 7. The transmit signal (TX) is typically coming from a DSP portion 8 (such as transmit shaping filters) of the ADSL transceiver through a digital to analog converter (DAC) of AFE (not shown). The transmit signal is then supplied with sufficient voltage and current by the line driver 1, and coupled via the hybrid circuit 3 and the transformer 7 to a transmission line 9, such as a telephone line or twisted-pair loop (twisted-pair copper line). The transmission line 9 has a certain line impedance Z (typically 100 Ω). The receive signal (RX) from the transmission line 9 is also coupled via the transformer 7 to the transceiver. The receive signal is coupled by the hybrid circuit 3 to the receive amplifier 5, and then supplied to the DSP portion 8 (such as channel equalizers) through an analog to digital converter (ADC) of AFE (not shown).

The transformer 7 is defined to have a turns ratio of 1: n. The turns ratio of the transformer 7 can be used to provide gain to the transmitted signal, and has a major effect to the power supply voltages of the line driver amplifiers. When the turns ratio n is greater than 1, the transformer 7 performs a step-up (by factor n) of the transmit signal to the transmission line 9, and thus the amount of voltage swing needed by the line driver amplifier is reduced.

However, a step-up transformer also performs a corresponding step-down (by factor 1/n) of the receive signal received from the transmission line, reducing the receive signal amplitude and signal to noise ratio (SNR). Further attenuation of the receive signal by the transformer in addition to the inherent transmission line attenuation can cause the malfunction of the transceiver, depending on the sensitivity of the receiver circuitry. However, there are some reasons preferring a turns ratio greater than 1.

First, it is desirable to integrate the TX line driver into an AFE chip so as to minimize the cost. This normally implies that the TX line driver has to operate at a low supply voltage, for example, 5V or 3.3V. However, since the ADSL transmit signal on the line is typically required to have about 15 volts peak-to-peak differential (Vppd), it is necessary to step-up the transmit signal by a turns ratio of, for example, n=4.25.

Furthermore, it is desirable to reduce the number of different voltage supplies needed to implement a DSL transceiver. Thus, it is also desirable that the line driver operates at the same supply voltage, for example, as the AFE chip, instead of its conventional voltage supply of 10–12 V which is required to drive the transmit signal without a step-up (i.e., the turns ratio of 1).

In addition, reducing the power required for a line driver is desirable, for example, in the Universal Serial Bus (USB)-based customer premises equipment (CPE) modems, such as a modem integrated into a personal computer (PC).

As mentioned above, however, a step-up of the transmit signal means the corresponding step-down of the receive signal, which degrades the SNR of the receive signal by the same amount. Such a degraded noise performance of a line interface directly affects the data rate of the transceiver. Accordingly, it would be desirable to build a line interface that can simultaneously allow a line driver operating from a low power supply voltage and not incur the severe noise penalty associated with the traditional line interface with a hybrid circuit.

BRIEF DESCRIPTION OF THE INVENTION

A line interface couples signals between a data transceiver and a transmission line having a load impedance Z. The line interface includes a transformer, a driver circuit for supplying a transmit signal from the data transceiver to the transformer, and a receiver circuit for receiving a receive signal from the transformer. The transformer includes a first port coupled to the transmission line, a second port coupled to the driver circuit, a third port coupled to the receiver circuit, a first winding part having a turns ratio of 1: n, where n>1, for coupling the transmit signal from the second port to the first port, and a second winding part having a turns ratio of 1: m, where m<n, for coupling receive signal from the first port to the third port.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a diagram illustrating a typical hybrid structure of a conventional analog interface of an ADSL system.

FIG. 2 is a diagram schematically illustrating a multiport transformer for a low-voltage integrated line driver in accordance with the present invention.

FIG. 3A is a diagram illustrating a line interface including a multiport transformer in accordance with a specific embodiment of the present invention.

FIG. 3B is a diagram illustrating a conventional line interface including a conventional transformer and an inverting type RX amplifier.

FIG. 4 is a diagram illustrating an example of a line interface having a differential structure in accordance with a specific embodiment of the present invention.

FIG. 5A is a diagram illustrating a line interface including the multiport transformer and a non-inverting type RX amplifier in accordance with a specific embodiment of the present invention.

FIG. 5B is a diagram illustrating a conventional line interface including a conventional transformer and a non-inverting type RX amplifier.

FIG. 6A is a diagram illustrating a line interface with an active termination architecture, including the multiport transformer and an inverting type RX amplifier in accordance with a specific embodiment of the present invention.

FIG. 6B is a diagram illustrating a conventional line interface with an active termination architecture, including a conventional transformer and an inverting type RX amplifier.

FIG. 7 is a diagram illustrating a line interface with an active termination architecture, including the multiport transformer and a non-inverting type RX amplifier in accordance with a specific embodiment of the present invention.

FIG. 8A is a diagram illustrating a line interface including the multiport transformer and a receive amplifier implementing a difference function directly, in accordance with a specific embodiment of the present invention.

FIG. 8B is a diagram illustrating a line interface including a conventional transformed and a receive amplifier implementing a difference function directly.

FIG. 9A is a diagram illustrating a line interface including the multiport transformed and a receive amplifier implementing a difference function directly, in accordance with a specific embodiment of the present invention.

FIG. 9B is a diagram illustrating a line interface including a conventional transformed and a receive amplifier implementing a difference function directly.

FIG. 9C is a diagram illustrating a line interface with active termination including the multiport transformer and a receive amplifier implementing a difference function directly, in accordance with a specific embodiment of the present invention.

FIG. 10 is a diagram schematically illustrates a signal coupling method in a line interface in accordance with a specific embodiment of the present invention.

DETAILED DESCRIPTION

Embodiments of the present invention are described herein in the context of a line interface and an apparatus and method for coupling a transceiver and a transmission line. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 2 schematically illustrates a new structure of a transformer 10 for a low-voltage integrated line driver, according to the present invention. The transformer 10 and a low-voltage line driver are implemented in an ADSL line interface of the present invention. As shown in FIG. 2, The transformer 10 couples the transmit signal (TX) and receive signal (RX) between a transceiver and a transmission line.

The transformer 10 is a multiport transformer and includes a first port (Line port) 12, a second port (TX port) 14, and a third port (RX port) 16. The first port is adapted to being coupled to the transmission line (with an impedance Z). The second port 14 is adapted to being coupled to a driver circuit of the transceiver, and the third port 16 is adapted to being coupled to a receiver circuit of the transceiver. The transmit signal is coupled from the second port 14 to the first port 12 through a first path having a step-up ratio of n. Typically, n>1 for providing actual step-up of the transmit signal. On the other hand, the receive signal (RX) is coupled from the first port 12 to the third port 16 through a second path having the step-down ratio of 1/m, where m<n. That is, the multiport transformer 10 has two turns ratio parameters n and m: n is the step-up parameter seen by the TX signal, and m is the step down parameter seen by the RX signal. Typically, m is set to be 1 so that the receive signal is coupled without a step-down. However, m may be smaller than 1 so as to step "up" the receive signal.

It should be noted that although m is referred as a "step-down" parameter m, the second path may couple the receive signal without a step-down, or may steps up the receive signal, as described above. Similarly, although the second path is described to have the "step-down" ratio of 1/m, when m is equal to or smaller than 1, the second path actually couples the receive signal without a step-down or provides a step-up to the receive signal. The step-up ratio (of the first path) means a coupling ratio along the transmit signal path, and the step-down ratio (of the second path) means a coupling ratio along the receive signal path, which is in the opposite direction of the transmit signal path.

FIG. 3A illustrates a line interface 30 including a transformer 20 in accordance with a specific embodiment of the present invention. The line interface 30 also includes an inverting type receive amplifier 32 in accordance with this specific embodiment. As shown in FIG. 3A, the transformer 20 includes a first winding part 21 having a turns ratio of 1:n, and a second winding part 22 having a turns ratio of 1:m. The first winding part 21 is coupled between a TX port 24 and a Line port 26, and the second winding part 22 is coupled between the Line port 26 and a RX port 28. It should be noted that the input resistors of the receive amplifier 32 have resistance R and resistance 2mR/n to provide a first-order cancellation of the simultaneously occurring transmit signal from the receiving path.

In order to compute the noise performance of the entire system of the AFE and the line interface 30, two parameters $G_{RX}$ and $G_n$ are calculated. The quantity $G_n$ is the noise gain for the receive amplifier noise $V_n$, referred to the transmission line, i.e., an effective noise at the Line port 26. The quantity $G_{RX}$ is the signal gain for the receive signal from the line to the output of the receive amplifier 32. When the receiver amplifier 32 has a feedback resistance of $R_F$, as shown in FIG. 3A, these parameters are expressed as follows:

$$G_{RX} = \frac{1}{m} \cdot \frac{R_F}{R} \quad (1)$$

$$G_n = \frac{1}{G_{RX}} + m + \frac{n}{2} \quad (2)$$

The lower the noise $G_n$, the better data rate of the entire system is achieved.

For comparison, FIG. 3B illustrates a conventional line interface 34 including a conventional transformer 36 and an inverting receive amplifier 38. For this conventional structure, the parameters $G_{RX}$ and $G_n$ are calculated as follows:

$$G_{RX} = \frac{1}{n} \cdot \frac{R_F}{R} \quad (3)$$

$$G_n = \frac{1}{G_{RX}} + n + \frac{n}{2} \quad (4)$$

Comparing Equation (1) with Equation (3), and Equation (2) with Equation (4), since the turns ratio m<n, the present invention achieves a higher receive signal gain and a lower noise gain, providing a better SNR for the receive signal.

FIG. 3A shows a single-ended representation of the line interface 30 for simplicity. However, an actual implementation of the line interface 30 may have a double-ended (differential) structure, as is well understood by those of ordinary skill in the art. FIG. 4 illustrates an example of a line interface 40 having a differential structure in accordance with a specific embodiment of the present invention. The line interface 40 includes a multiport transformer 42. As show in FIG. 4, the multiport transformer 42 has a TX port 44, a Line port 46, and a RX port 48, and provides a step-up ratio n for the transmit signal and a step-down ratio m for the receive signal. The receiving path is illustrated with a hybrid circuit, a receive amplifier, and a highpass filter circuit.

FIG. 5A illustrates a line interface 50 including the transformer 20 and a non-inverting type receive amplifier 52 in accordance with a specific embodiment of the present invention. The structure of the transformer 20 is the same as described above. Although FIG. 5A shows a single-ended representation of the line interface 50 for simplicity, an actual implementation of the line interface 50 may have a double-ended (differential) structure similar to the line interface 40, as is well understood by those of ordinary skill in the art. For the line interface 50, the gain parameters $G_{RX}$ and $G_n$ are calculated as follows:

$$G_{RX} = \left(1 + \frac{R_F}{R_S}\right) \cdot \frac{1}{m + \frac{n}{2}} \quad (5)$$

$$G_n = m + \frac{n}{2} \quad (6)$$

where $R_S$ is a coupling resistance to a reference-voltage (ground).

For comparison, FIG. 5B illustrates a conventional line interface 54 including a conventional transformer 36 and a non-inverting receive amplifier 58. For this conventional structure, the parameters $G_{RX}$ and $G_n$ are calculated as follows:

$$G_{RX} = \left(1 + \frac{R_F}{R_S}\right) \cdot \frac{1}{\left(\frac{3n}{2}\right)} \quad (7)$$

$$G_n = \frac{3n}{2} \quad (8)$$

Comparing Equation (5) with Equation (7), and Equation (6) with Equation (8), the present invention achieves a higher receive signal gain and a lower noise gain, providing a better SNR for the receive signal.

It is also possible to use a positive feedback in the line interface to achieve a matching impedance. FIG. 6A illustrates a line interface 60 including the multiport transformer 20, an inverting type RX amplifier 62, a TX line driver 64, and a positive feedback path 66 having a gain of (1−K) coupled to the input of the TX line driver 64. In this active termination architecture, the resistance of a back termination resistor RT is reduced by factor K, where K<1, thereby decreasing the power dissipation due to the back termination resistor RT. Although FIG. 6A shows a single-ended representation of the line interface 60 for simplicity, an actual implementation of the line interface 60 may have a doubleended (differential) structure, as is well understood by those of ordinary skill in the art.

FIG. 6B illustrates, for comparison, a conventional line interface 68 with an active termination architecture, including a conventional transformer 36. The line interface 60 according to the present invention also achieves a lower noise gain and a higher receive signal gain than that of the corresponding conventional structure with an active termination in a similar manner as described above.

In addition, a line interface with an active termination may have a non-inverting RX amplifier instead of the inverting RX amplifier 62. As shown in FIG. 7, in accordance with a specific embodiment of the present invention, the line interface 70 includes the multiport transformer 20 and a non-inverting RX amplifier, and has an active termination architecture. Although FIG. 7 shows a single-ended representation of the line interface 70 for simplicity, an actual implementation of the line interface 70 may have a double-ended (differential) structure, as is well understood by those of ordinary skill in the art.

FIG. 8A illustrates a line interface 80 having a new configuration having the multiport transformer 20 where a receive amplifier 82 implements a difference function directly, in accordance with a specific embodiment of the present invention. In this configuration, the turns ratios n and m of the transformer 20 must satisfy n<2m. For the line interface 80, the gain parameters $G_{RX}$ and $G_n$ are calculated as follows:

$$G_{RX} = \frac{1}{m}\left(1 + \frac{R_F}{R}\right) \quad (9)$$

$$G_n = m \quad (10)$$

The configuration of the line interface 80 achieves a lower noise gain $G_n$ than other configurations discussed above. For example, compared with Equation (2) (noise gain of the line interface 30 shown in FIG. 3A) and Equation (6) (noise gain of the line interface 50 shown in FIG. 5A), Equation (10) yields the lower noise gain for a given turns ratio n and a given receive signal gain $G_{RX}$, which are typically predetermined parameters in real applications.

FIG. 8B illustrates, for comparison, a conventional line interface 84 having a conventional transformer 36, where a receive amplifier 86 implements a difference function directly. For the conventional line interface 84, the gain parameters $G_{RX}$ and $G_n$ are calculated as follows:

$$G_{RX} = \frac{1}{n}\left(1 + \frac{R_F}{R}\right) \quad (11)$$

$$G_n = n \quad (12)$$

As is apparent from comparing Equations (9) and (10) with Equations (11) and (12), the line interface 80 according to the present invention also achieves a lower noise gain and a higher receive signal gain than that of the corresponding conventional structure with a receive amplifier implementing a direct difference function.

Having two turns ratios n and m gives a freedom to achieve a required $G_{RX}$. In order to cancel the transmit signal in a receive path, the feedback resistance $R_F$ and the input resistance R of the receive amplifier must satisfy a specific relationship. For example, in the line interface 80 shown in FIG. 8A, the feedback resistance $R_F$ is given as:

$$R_F = \frac{\frac{n}{2m}}{1-\frac{n}{2m}} \cdot R \quad (13)$$

Thus, from Equation (9), the receive signal gain $G_{RX}$ is expressed as:

$$G_{RX} = \frac{1}{m - \frac{n}{2}} \quad (14)$$

However, in the conventional line interface 84 shown in FIG. 8B, the receive signal gain is given as $$G_{RX} = \frac{2}{n},$$

since $R_F$=R for the transmit signal cancellation. Therefore, there is no freedom to control the receive signal gain $G_n$ for a fixed parameter of the turns ratio n in the conventional configuration. The freedom of controlling receive signal gain $G_{RX}$ is similarly obtained in other configurations of the line interface in accordance with the present invention, as is indicated by the parameter m in the corresponding receive signal gain equations described above.

FIG. 9A illustrates a line interface 90 having another new configuration having the multiport transformer 20 where a receive amplifier 92 implements a difference function directly, in accordance with a specific embodiment of the present invention. In this configuration, the turns ratios n and m of the transformer 20 must satisfy n>2m. For the line interface 90, the gain parameters $G_{RX}$ and $G_n$ are calculated as follows:

$$G_{RX} = \frac{1}{m - \frac{n}{2}} \quad (15)$$

$$G_n = \frac{n}{2} \quad (16)$$

The configuration of the line interface 90 achieves a lower noise gain $G_n$ than that of the line interface 80 for a given turns ratio n and a given receive signal gain $G_{RX}$, because the noise gain $G_n$ of the line interface 80 is also expressed as, from Equations (10) and (14), $$G_n = \frac{1}{G_{RX}} + \frac{n}{2}.$$

Therefore, the configuration of the line interface 90 yields the lowest noise gain among the above examples.

FIG. 9B illustrates, for comparison, a corresponding line interface configuration 94 having a conventional transformer 36, where a receive amplifier 96 implements a difference function directly in a similar manner as the receive amplifier 92 of the line interface 90. For this configuration, the receive signal gain $G_{RX}$ is given as $$G_{RX} = -\frac{1}{n} \cdot \frac{R_F}{R}.$$

However, the output signal $V_o$ of the receive amplifier 96 for a transmit signal voltage $V_{TX}$ and a receive signal voltage $V_{RX}$ is calculated as:

$$V_o = \left(1 + \frac{R_F}{R}\right) \cdot V_{TX} - \frac{R_F}{R}\left(\frac{V_{TX}}{2} + \frac{V_{RX}}{n}\right)$$

$$= \left(1 + \frac{R_F}{2R}\right) \cdot V_{TX} - \frac{R_F}{R} \cdot \frac{1}{n} \cdot V_{RX}.$$

Thus, there is no way to cancel the transmit signal from the receive path in this configuration having a conventional transformer 36, while the present invention with the multiport transformer 20 realizes the lowest noise gain as well as the transmit signal cancellation.

FIG. 9C illustrates a line interface 100 with active termination in accordance with a specific embodiment of the present invention. The configuration of the line interface 100 shows the implementation of the concept illustrated in FIG. 9A for the case of active termination. Similarly to the case of conventional line interface configuration 94 (shown in FIG. 9B) described above, the transmit signal cannot be cancelled in a corresponding conventional configuration with active termination using a conventional transformer.

In examples discussed above, the hybrid circuit and line interface structures have been shown using resistors to implement gain functions around the receive amplifier and to achieve the hybrid subtraction. However, capacitors, instead of resistors, may also be used in all of these structures, and similar noise reduction and signal gain increase can be achieved using the multiport transformer of the present invention. In the case of capacitive hybrid structure, the equivalent impedance is used instead of resistance and a proper DC biasing circuit can be employed, as is well understood by those of ordinary skill in the art.

As described above, the multiport transformer of the present invention, combined with various types of hybrid circuit, line driver, and receive amplifier circuits, realizes a low-voltage line interface having an improved noise performance. By adding a second winding part to a conventional step-up transformer, a receive signal path without an undesirable step-down is made available for the receive signal. Although the multiport transformer of the present invention is described mainly referring to the transformer 20, the configuration of the multiport transformer is not limited to those structures shown in the corresponding drawings, and includes any transformer configuration that realizes a first step-up coupling for the transmit signal and a second coupling for the receive signal without an undesirable step-down. That is, the receive signal is coupled to the transceiver without a step-down, with a step-down smaller than the standard step-down that should be if the receive signal is coupled via the same coupling path as the transmit signal, or with a step-up.

In an ADSL interface application of the present invention, the multiport transformer is combined with a low voltage line driver. For example, the multiport transformer is combined with an integrated single chip including an AFE and a low voltage line driver, such as a single 5V supply voltage line driver, realizing a low-voltage line interface with an improved noise performance. The present invention is very advantageous in such a combination of the multiport transformer and a line driver with a single low-voltage supply. It should be noted that the receive amplifier may be internal to the AFE or external to the AFE. In addition, the receive amplifier may be omitted entirely, and in such a case the receive circuit has a passive hybrid structure.

As described above, the present invention applies to ADSL interfaces, and specifically to the G.992.1 standard. However, the present invention is not limited to ADSL or a specific standard, but is applicable to any DSL systems, i.e., xDSL. Furthermore, the present invention may also be applied to any transceiver systems such as Ethernet. In addition, although the present invention is explained with single-ended circuit structures for simplicity, the present invention applies to both single-ended and differential circuit structures.

According to the present invention, signals between a transceiver and a transmission line are coupled with a step-up ratio n for a transmit signal, and with a step-down ratio 1/m for a receive signal via a multiport transformer. FIG. 10 schematically illustrates a signal coupling method in accordance with a specific embodiment of the present invention. The multiport transformer may be the transformer 10 or 20 as described above. The multiport transformer has a TX port, a RX port, and a Line port.

First, a transmit signal (TX) from the driver circuit is supplied to the TX port of the transformer (101). A first path from the TX port to the Line port is provided for the transmit signal to couple the transmit signal to the transmission line (103). The first path through the transformer has a step-up ratio of n. The first path may include a first winding part of the transformer having a turns ratio of n.

When a receive signal (RX) comes from the transmission line, it is received at the Line port of the transformer (105), and a second path from the Line port to the RX port is provided (107) so as to couple the receive signal to the receive circuit of the transceiver. The second path has a step-down ratio of 1/m, where m<n. The second path may include a second winding part of the transformer having a turns ratio of m. By selecting the value of m smaller than that of n, for example, m=1, the undesirable step-down of the receive signal is reduced or eliminated. By choosing m<1, a step-up of the receive signal is also possible.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A transformer for coupling signals between a transceiver and a transmission line, said transceiver including a driver circuit for supplying a transmit signal to said transformer and a receiver circuit for receiving a receive signal from said transformer, said transformer comprising:
    a first port adapted to being coupled to the transmission line;
    a second port adapted to being coupled to the driver circuit;
    a third port adapted to being coupled to the receiver circuit;
    a first winding part having a turns ratio of 1:n, where n>1, for coupling the transmit signal from said second port to said first port; and
    a second winding part having a turns ratio of 1:m, where m<n, for coupling the receive signal from said first port to said third port.
2. A transformer according to claim 1, wherein m=1.

3. A transformer according to claim 1, wherein n<2m.
4. A transformer according to claim 1, wherein $$m < \frac{1}{2}n.$$

5. A line interface for coupling signals between a data transceiver and a transmission line having a load impedance Z, said line interface comprising:
    a transformer;
    a driver circuit for supplying a transmit signal from said data transceiver to said transformer; and
    a receiver circuit for receiving a receive signal from said transformer,
    wherein said transformer includes:
        a first port coupled to said transmission line;
        a second port coupled to said driver circuit;
        a third port coupled to said receiver circuit;
        a first winding part having a turns ratio of 1:n, where n>1, for coupling the transmit signal from said second port to said first port; and
        a second winding part having a turns ratio of 1:m, where m<n, for coupling the receive signal from said first port to said third port.
6. A line interface according to claim 5, wherein an effective input impedance at said second port is $Z/n^2$ when said third port is open.
7. A line interface according to claim 5, wherein an effective input impedance at said third port is $Z/m^2$ when said second port is open.
8. A line interface according to claim 5, wherein said receiver circuit includes:
    a first sensing resistor having a resistance R; and
    a second sensing resistor having a resistance 2mR/n.
9. A line interface according to claim 5, wherein m=1.
10. A line interface according to claim 5, wherein n<2m.
11. A line interface according to claim 5, wherein $$m < \frac{1}{2}n.$$

12. A line interface according to claim 5, wherein said driver circuit and said receiver circuit have a single-ended circuit structure.
13. A line interface according to claim 5, wherein said driver circuit and said receiver circuit have a differential circuit structure.
14. A line interface according to claim 5, wherein said driver circuit and said receiver circuit include a resistive hybrid circuit.
15. A line interface according to claim 5, wherein said driver circuit and said receiver circuit include a capacitive hybrid circuit.
16. A line interface according to claim 5, wherein said driver circuit and said receiver circuit include a passive hybrid circuit.
17. A line interface according to claim 5, wherein said line interface is adapted to an ADSL system.
18. A line interface according to claim 17, wherein said line driver is integrated in a single IC chip of an analog front end.
19. A line interface according to claim 18, wherein said receive circuit is integrated in said IC chip of the analog front end.
20. A line interface according to claim 17, wherein said receive circuit includes a receive signal amplifier.

21. A line interface according to claim 17, wherein said line driver operates with a supply voltage of about 5 V.

22. An apparatus for coupling signals between a transceiver and a transmission line via a multi-port transformer, said transceiver including a driver circuit and a receive circuit, said transformer including a line port, a transmit port, and a receive port, said apparatus comprising:

means for supplying a transmit signal from the driver circuit to the transmit port of the transformer;

means for providing a first path from the transmit port to the line port so as to couple the transmit signal to the transmission line, said first path having a coupling ratio of n, where n>1;

means for supplying a receive signal from the transmission line to the line port of the transformer; and means for providing a second path from the line port to the receive port so as to couple the receive signal to the receive circuit, said second path having a coupling ratio of 1/m, where m<n.

23. An apparatus according to claim 22, wherein said first path includes a first winding part of the transformer, said first winding part having a turns ratio of 1:n, and wherein said second path includes a second winding part of the transformer, said second winding part having a turns ratio of 1:m.

24. A method for coupling signals between a transceiver and a transmission line via a multi-port transformer, said transceiver including a driver circuit and a receive circuit, said transformer including a line port, a transmit port, and a receive port, said method comprising:

supplying a transmit signal from the driver circuit to the transmit port of the transformer;

providing a first path from the transmit port to the line port so as to couple the transmit signal to the transmission line, said first path having a coupling ratio of n, where n>1;

supplying a receive signal from the transmission line to the line port of the transformer; and providing a second path from the line port to the receive port so as to couple the receive signal to the circuit, said second path having a coupling ratio of 1/m, where m<n.

25. A method according to claim 24, wherein said first path includes a first winding part of the transformer, said first winding part having a turns ratio of 1:n, and wherein said second path includes a second winding part of the transformer, said second winding part having a turns ratio of 1:m.

26. A method according to claim 24, wherein m=1.
27. A method according to claim 24, wherein n<2m.
28. A method according to claim 24, wherein $$m < \frac{1}{2}n.$$

* * * * *